United States Patent
Hirose et al.

(10) Patent No.: US 7,477,475 B2
(45) Date of Patent: Jan. 13, 2009

(54) HELICAL SCAN TYPE MAGNETIC TAPE REPRODUCTION APPARATUS AND MAGNETIC TAPE REPRODUCTION METHOD

(75) Inventors: Toshiyuki Hirose, Kanagawa (JP); Hideki Nonoyama, Kanagawa (JP); Osamu Nakamura, Kanagawa (JP); Akira Itou, Kanagawa (JP); Yoshinori Saito, Kanagawa (JP)

(73) Assignee: Sony Corporation, Tokyo (JP)

( * ) Notice: Subject to any disclaimer, the term of this patent is extended or adjusted under 35 U.S.C. 154(b) by 59 days.

(21) Appl. No.: 11/747,464

(22) Filed: May 11, 2007

(65) Prior Publication Data

US 2008/0002284 A1 Jan. 3, 2008

(30) Foreign Application Priority Data

May 26, 2006 (JP) ............................. 2006-146955

(51) Int. Cl.
*G11B 5/584* (2006.01)
(52) U.S. Cl. .................................................. 360/77.13
(58) Field of Classification Search ........................ None
See application file for complete search history.

(56) References Cited

U.S. PATENT DOCUMENTS 6,078,459 A * 6/2000 Nonoyama ............... 360/73.08

FOREIGN PATENT DOCUMENTS

| JP | 4-78016 | 3/1992 |
|---|---|---|
| JP | 6-96500 | 4/1994 |
| JP | 6-349156 | 12/1994 |
| JP | 7-29256 | 1/1995 |
| JP | 09-245395 | 9/1997 |
| JP | 11-259835 | 9/1999 |
| JP | 2001-344854 | 12/2001 |

* cited by examiner

*Primary Examiner*—K. Wong
(74) *Attorney, Agent, or Firm*—Oblon, Spivak, McClelland, Maier & Neustadt, P.C.

(57) ABSTRACT

Disclosed herein is a helical scan type magnetic tape reproduction apparatus, including: a helical scan type reproduction head capable of moving in the track widthwise direction by displacement of said actuator itself; target time decision means for measuring a period of time from a reference point of time with regard to each of a plurality of markers recorded in a dispersed relationship at predetermined positions on the tracks in advance to the marker by a predetermined number of times, averaging the measurement time periods of the markers and storing the average time periods; and tracking control means for measuring actual time periods from the reference time points with regard to the markers and performing updating control of a control voltage to be applied to said actuator for said reproduction head in accordance with time information of the differences between the target time periods and the actual time periods.

7 Claims, 14 Drawing Sheets

MOVING LOCUS OF HEAD

MOVING LOCUS OF HEAD

REPRODUCTION SIGNAL ENVELOPE (ON-TRACK)

REPRODUCTION SIGNAL ENVELOPE (OFF-TRACK)

HELICAL SCAN TYPE MAGNETIC TAPE REPRODUCTION APPARATUS AND MAGNETIC TAPE REPRODUCTION METHOD

CROSS REFERENCES TO RELATED APPLICATIONS

The present invention contains subject matter related to Japanese Patent Application JP 2006-146955 filed in the Japan Patent Office on May 26, 2006, the entire contents of which being incorporated herein by reference.

BACKGROUND OF THE INVENTION

1. Field of the Invention

The present invention relates to a helical scan type magnetic tape reproduction apparatus and a helical scan type magnetic tape reproduction method suitable for use, for example, for reproduction of a magnetic tape on which data of a computer or the like are recorded.

2. Description of the Related Art

In the past, a helical scan type magnetic tape recording and reproduction apparatus is used as an apparatus for recording and storing data of a computer. A magnetic tape recording and reproduction apparatus of the type mentioned has such a configuration as described below.

First, recording of data is described. A recording head and associated elements are shown in FIG. 11. Referring to FIG. 11, a rotary drum 2 is mounted for rotation on a fixed drum 1, and a recording head 3 is mounted on the outer periphery of a lower portion of the rotary drum 2. Actually, while a pair of such recording heads 3 is provided, the other one of the recording heads 3 is provided on the opposite side displaced by 180 degrees. Accordingly, as shown in FIG. 12, data recording on a magnetic tape 4 is performed by rotating the rotary drum 2 at a fixed speed in a state wherein the magnetic tape 4 is wrapped on the rotary drum 2 and the fixed drum 1 while the magnetic tape 4 is in a traveling state at a fixed speed. A pair of guide posts 6 and 7 guide the magnetic tape 4.

On the other hand, data reproduction (including read after write when data recording is performed) is performed, for example, by a pair of reproduction heads provided at positions displaced by 180 degrees from each other on the rotary drum 2. Upon the data reproduction, the reproduction heads are controlled so as to pass just above the central position of a track 8 as shown in FIG. 13. A state wherein the reproduction heads as just described assumes such a moving locus as just described is called on-track. On the other hand, a state wherein the moving locus of the reproduction heads is offset from a track as shown in FIG. 14 is called off-track.

In FIGS. 15A and 15B, reproduction signal envelopes in the on-track state and the off-track state are illustrated. As recognized from FIGS. 15A and 15B, the track is not traced over the full width thereof by the reproduction heads in the off-track state. Therefore, the amplitude level of a reproduction signal drops.

Thus, in order to avoid the off-track, tracking servo (magnetic tape feeding phase control) is applied to feed a magnetic tape. A servo system for such tracking servo is shown in FIG. 16. Referring to FIG. 16, fixed rotary servo is applied to a drum motor 9, and phase servo is applied to a capstan motor 10 for feeding the magnetic tape 4 together with a pinch roller 11. A particular example of capstan phase servo control is illustrated in FIG. 17.

While, as shown in FIG. 17, the moving locus of the reproduction heads is indicated by an arrow mark of a solid line, it is recognized from FIG. 17 that a track phase b is in the on-track state while track phases a and c are in the off-track state. Accordingly, in order to achieve a state wherein the track phases a and c usually and individually coincide with the track phase b, the feeding amount of the magnetic tape 4 may be adjusted so that the phase relationship between the reproduction heads and the magnetic tape 4 may be such as the track phase b. In other words, the phase servo is applied to the capstan motor 10. Such a capstan motor phase servo as just described is called tracking servo.

Phase detection is demanded in order to apply the phase servo. The principle of TATF (Timing Auto Track Finding) which is one of phase detection methods is illustrated in FIGS. 18A and 18B. Referring to FIG. 18A, as well as reproduction heads 21 and 22, a PG magnet 24 for detecting the phase of the rotary drum 2 is mounted on the rotary drum 2, and a PG pulse is generated from a PG sensor 23 every time the PG magnet 24 reaches a specific rotation phase. Referring to FIG. 18B, a marker (signal) 28 is recorded in advance at the same position of the tracks 8 on the magnetic tape 4. The reproduction signal from the reproduction head 21 is processed by a marker detection circuit 26 through a rotary transformer 25 and a reproduction circuit 29 so that a marker signal (marker signal pulse) can be detected. Consequently, a time length t from a point of time of generation of the PG pulse to detection of the marker signal can be measured by a time measurement circuit 27.

It is recognized that, although the marker 28 is recorded at the positions same as each other on the tracks 8 as shown in FIG. 18B, the time length t is given in a relationship of ta>tb>tc among the tracks a, b and c. In other words, if tb is obtained as the time length, then it can be decided that the reproduction head is in the on-track state, but, if ta is obtained as the time length, then it can be decided that the reproduction head is in the off-track state and the magnetic tape 4 is in a leading state with respect to the reproduction head 21. On the other hand, if tc is obtained as the time length, then it can be decided that the reproduction head is in the off-track state and the magnetic tape 4 is in a delaying state with respect to the reproduction head 21. The phase relationship between the reproduction head 21 and the track 8 can be measured by such a principle as described above, and, if it is recognized in advance that tb indicates the on-track state, then the tracking servo should be applied so as to implement t=tb.

Here, where it is tried to particularly calculate the values of the time lengths ta to tc with reference to FIGS. 19A to 19C, the following conditions are provided by the AIT3 format:

Track leading angle=6 degrees

Track width=5.5 μm

θm=θs=30 degrees

Rotary drum diameter=40 mm

Rotary drum speed=6000 rpm=100 rps

Marker position: position of 10 degrees from track top position

Off-track of tracks a and c: ±1 μm

Accordingly, since the time length tb is calculated as a period of time necessary for rotation by 10 degrees from the generation point of the PG pulse, the time length tb is obtained as tb=0.27777777 ms (=(1/100 rps)×(10 degrees/360 degrees)). Further, the angle conversion value of 1 μm off-track is obtained as 0.02727 degrees (=1 μm/Tan(6 degrees)/(π×40 mm)×360 degrees), and the time conversion value of the angle conversion value is obtained as 758 ns (=0.02727 degrees/360 degrees×(1/100 rps)). Therefore, the times lengths are obtained as ta=0.2785358 . . . ms, tb=0.2777777 . . . ms, and tc=0.02770198 . . . ms.

If it is assumed that the marker 28 is recorded at the positions of the tracks 8 same as each other as described above, the TATF operation according to the existing technique is such as described below. In the TATF operation, TATF learning is performed first, and then the TATF operation is performed. In the TATF learning, the capstan motor is placed in a free rotation (non-tracking) state. Accordingly, as indicated by a reproduction head traveling locus (indicated by an arrow mark of a solid line) in FIG. 20, the tracks 8 are scanned by the reproduction head in various track phase states to measure the time length t and the error rate. However, a marker is not necessarily detected every time the tracks 8 are scanned by the reproduction head. This is because the tracks 8 are not necessarily scanned usually in a state near to the on-track state or the off-track state.

It is to be noted that techniques regarding the TATF are disclosed individually in Japanese Patent Laid-Open No. Hei 6-96500 and Japanese Patent Laid-Open No. Hei 7-29256 (hereinafter referred to as Patent Documents 1 and 2, respectively). Further, techniques for moving a head in the track widthwise direction are disclosed individually in Japanese Patent Laid-Open No. Hei 11-259835 and No. Hei 4-78016 (Japanese Patent No. 2589859) (hereinafter referred to as Patent Documents 3 and 4, respectively). Further, a pilot signal is used as tracking information for DT (Dynamic Tracking) servo as disclosed in Japanese Patent Laid-Open No. Hei 6-349156 (Japanese Patent No. 3036298) (hereinafter referred to as Patent Document 5).

SUMMARY OF THE INVENTION

Incidentally, where such a TATF technique as described above is applied, no problem occurs if the tracks are free from a curve as seen in FIG. 21A. However, the TATF technique may not cope with such a curve of a track as seen in FIG. 21B. This is because, since the inertia of the capstan motor is high, the reproduction head may not respond at such a high speed that it can trace the track in a bent state in a period of several milliseconds in which the reproduction head scans one track. Therefore, the TATF can track only the average value of the curve of such a bent track as shown in FIG. 21B.

On the other hand, as the track width is reduced in order to increase the recording capacity, the tracks come to suffer from an ignorable curve. Although efforts have been made to suppress such curve, it is still difficult to achieve necessary and sufficient suppression of the curve. Thus, it seems a promising idea to adopt a technique called DT servo. According to the DT servo, a reproduction head is moved in a track widthwise direction by an actuator to apply such servo as to cause the reproduction head to trace a track curve. However, for the DT servo, some tracking information such as, for example, a pilot signal is requisite. Such tracking information is non-user data and redundant data, and therefore, this obstructs increase of the recording capacity. A technique relating to the DT servo has been adopted more than ten years ago in apparatus for broadcasting stations manufactured by the assignee of the present application.

Incidentally, where the track width is reduced in order to achieve high density recording of data, if a magnetic tape recorded by a certain magnetic tape recording and reproduction apparatus is reproduced by the same apparatus, no problem occurs. However, if the magnetic tape is reproduced by some other compatible magnetic tape recording and reproduction apparatus, a trouble sometimes occurs that data may not be reproduced from the magnetic tape because of a curve of a track.

Therefore, it is desirable to provide a helical scan type magnetic tape reproduction apparatus and a helical scan type magnetic tape reproduction method wherein, even where tracks on a magnetic tape from which data are to be read out suffer from a uniform curve, the data can be read out well from the tracks.

According to an embodiment of the present invention, there is provided a helical scan type magnetic tape reproduction apparatus including a helical scan type reproduction head mounted at an end of an actuator and capable of moving, in order to successively scan tracks on a magnetic tape, in the track widthwise direction by displacement of the actuator itself, target time decision means for measuring, in a non-tracking servo traveling state of the magnetic tape and in a traveling speed state of the magnetic tape displaced a little from a reproduction traveling speed, a period of time from a reference point of time with regard to each of a plurality of markers recorded in a dispersed relationship at predetermined positions on the tracks in advance to the marker by a predetermined number of times, averaging the measurement time periods of the markers obtained by the predetermined number of times of measurement and storing the average time periods with regard to the markers as target time periods, and tracking control means for measuring actual time periods from the reference time points with regard to the markers in a tracking servo traveling state of the magnetic tape and performing updating control of a control voltage to be applied to the actuator for the reproduction head in accordance with time information of the differences between the target time periods and the actual time periods.

According to another embodiment of the present invention, there is provided a helical scan type magnetic tape reproduction method including the steps of measuring, in a non-tracking servo traveling state of a magnetic tape and in a traveling speed state of the magnetic tape displaced a little from a reproduction traveling speed, a period of time from a reference point of time with regard to each of a plurality of markers recorded in a dispersed relationship at predetermined positions on tracks of the magnetic tape in advance to the marker by a predetermined number of times, averaging the measurement time periods with regard to the markers by the predetermined number of times of measurement and storing the average time periods with regard to the markers as target time periods, and measuring actual time periods from the reference time points with regard to the markers in a tracking servo traveling state of the magnetic tape and performing updating control of a control voltage to be applied to an actuator for a helical scan type reproduction head, which is mounted at an end of the actuator and capable of moving, in order to successively scan the tracks on the magnetic tape, in the track widthwise direction by displacement of the actuator itself, in accordance with time information of the differences between the target time periods and the actual time points.

In the helical scan type magnetic tape reproduction apparatus and the helical scan type magnetic tape reproduction method, target time periods with regard to markers indicative of the track centers of a plurality of markers on tracks of a magnetic tape are stored in advance. Then upon reproduction of data from the magnetic tape, DT servo is applied in a tracking servo state to the reproduction head in response to time information of the differences between the measurement actual time periods with regard to the markers from reference points of time and the target time periods with regard to the markers. Therefore, an on-track state is established at the positions of the markers of the tracks, and even if each track suffers from a uniform curve, data can be extracted well from the individual tracks.

DETAILED DESCRIPTION OF THE PREFERRED EMBODIMENT

Figure 1:
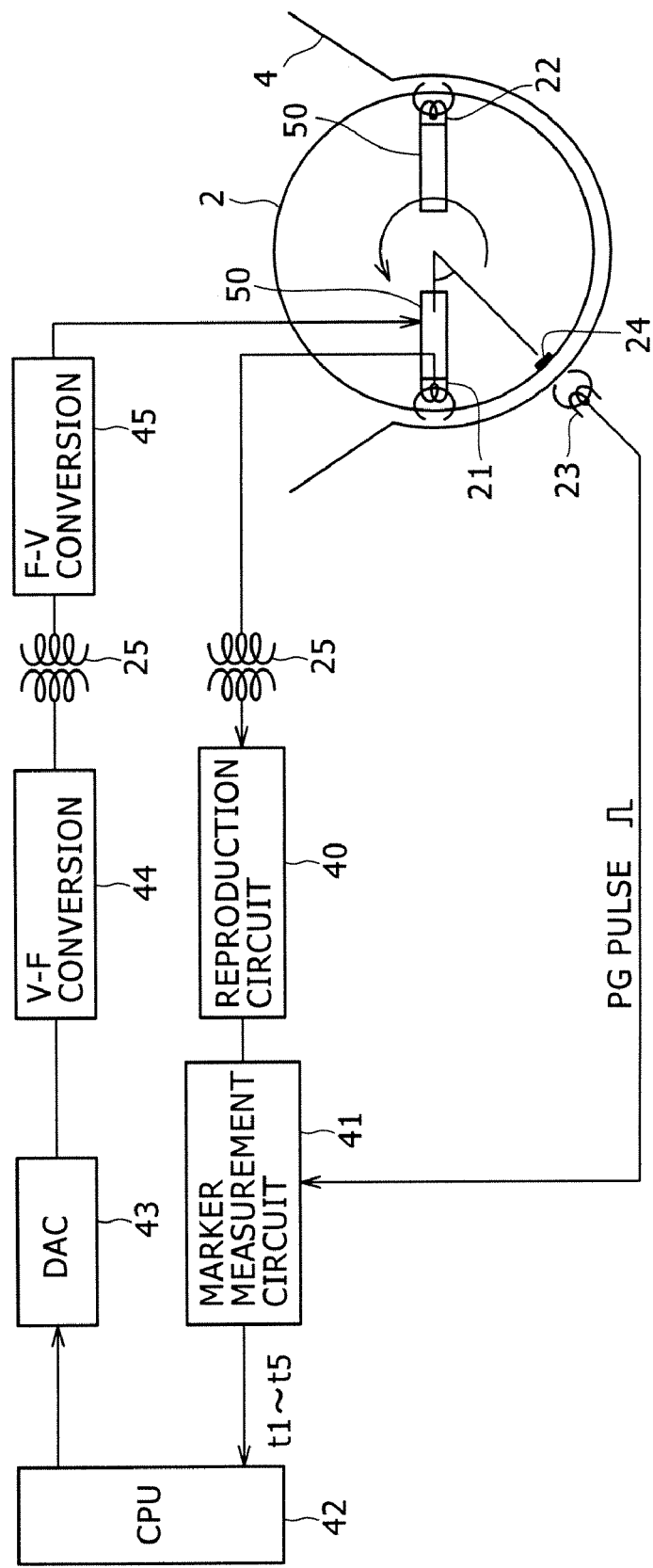
FIG. 1 is a block diagram showing a configuration of part of a helical scan type magnetic tape reproduction apparatus to which the present invention is applied.
Figure 16:
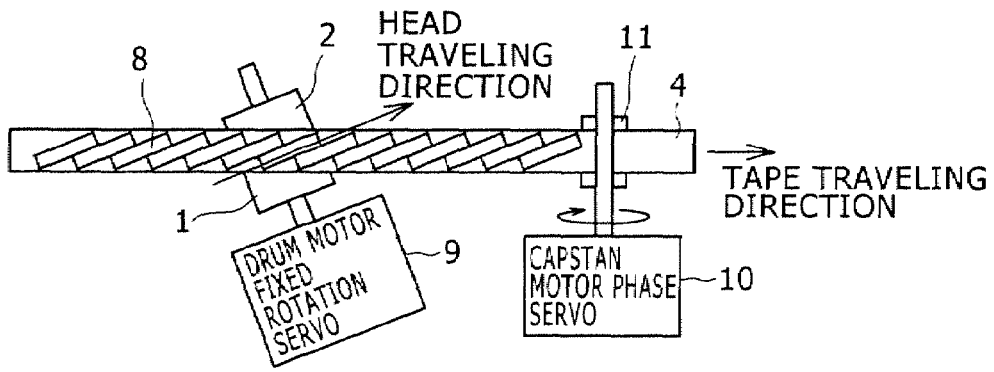
FIG. 16 is a schematic view showing a tracking servo system with respect to a magnetic tape.
Figure 17:
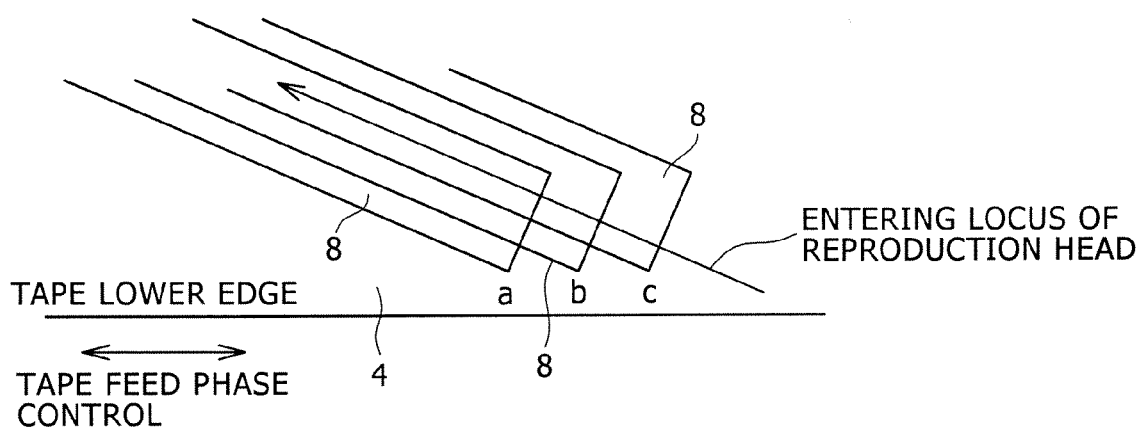
FIG. 17 is a view illustrating tracking servo as tape feeding phase control.
Figure 18A:
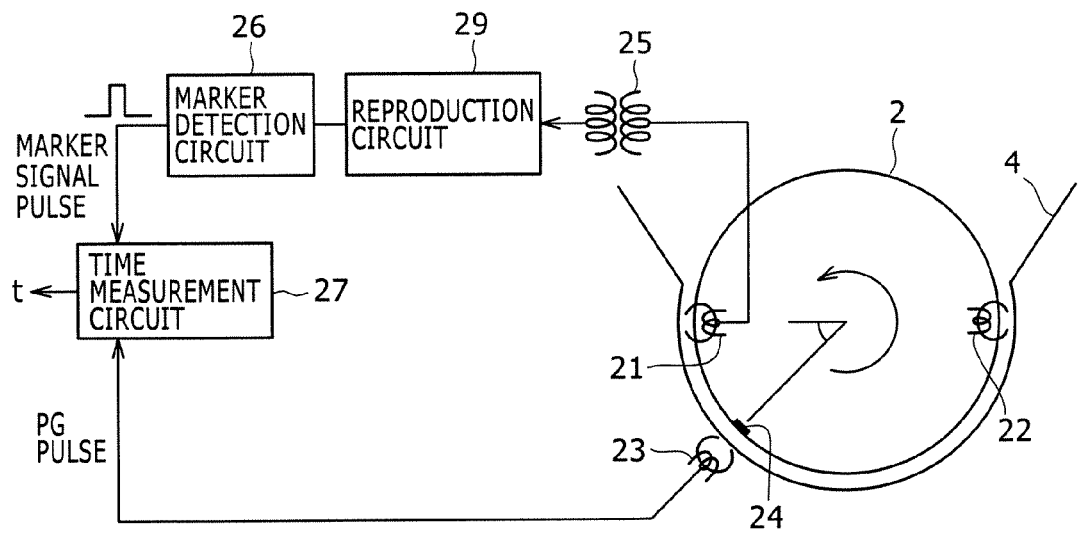
FIGS. 18A and 18B are a block diagram and a schematic view, respectively, illustrating a principle of TATF which is one of phase detection methods.
Figure 18B:
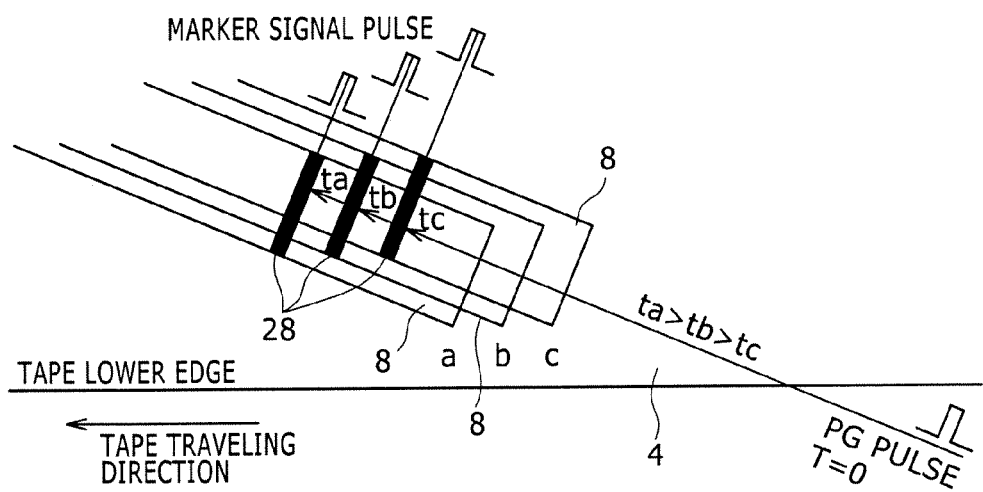
Figure 19A:
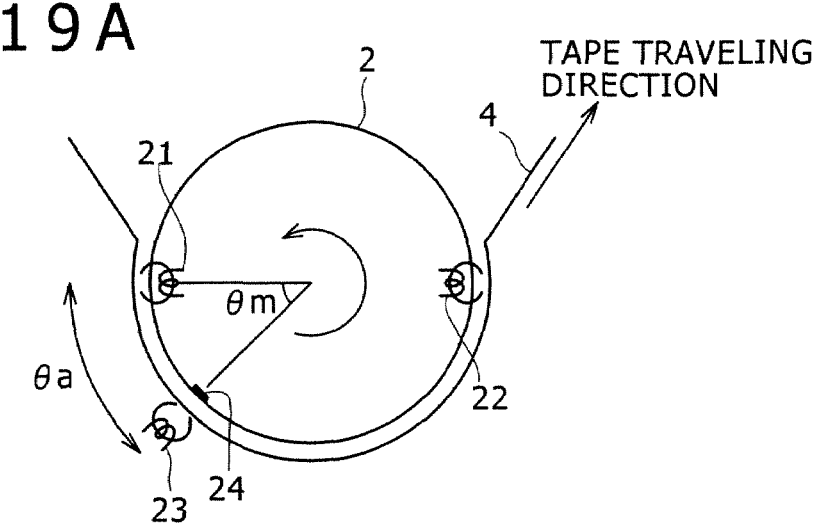
FIGS. 19A to 19C are schematic views illustrating test calculation of a time length from a point of time of generation of a PG pulse to marker detection.
Figure 19B:
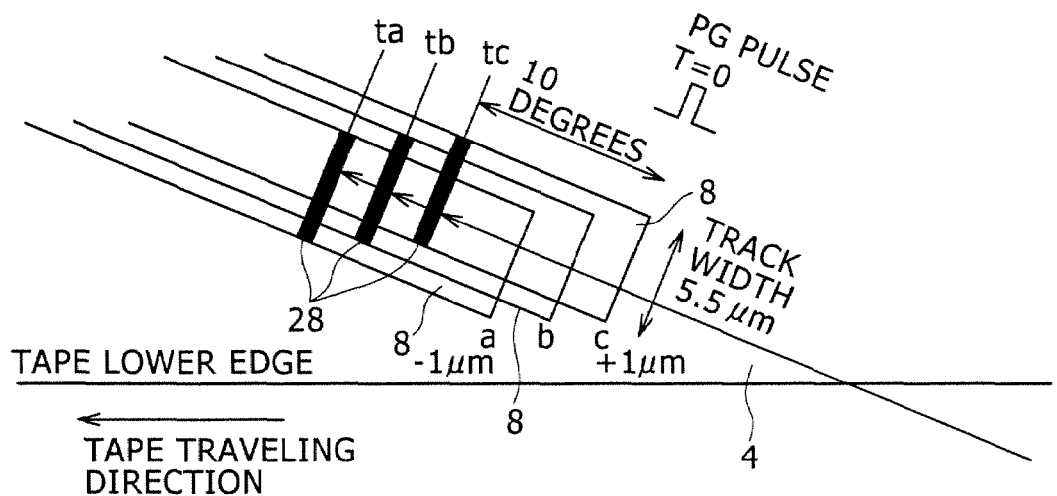
Figure 19C:
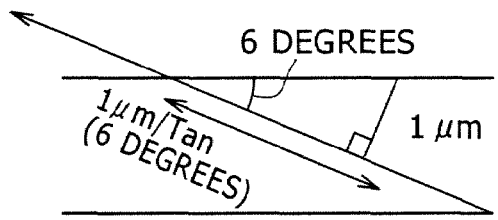
Figure 20:
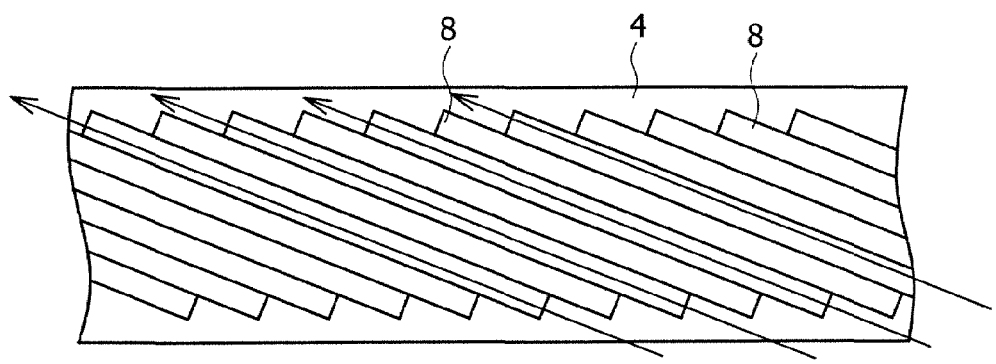
FIG. 20 is a schematic view showing a traveling locus of a reproduction head in a non-tracking state.
Figure 21A:
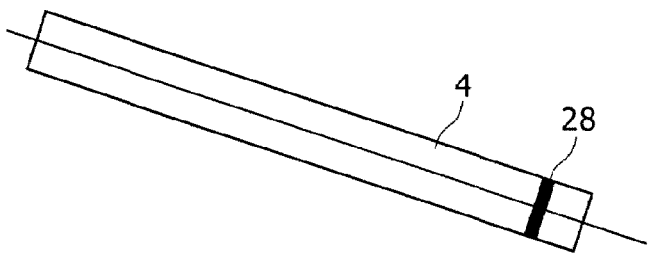
FIGS. 21A and 21B are schematic views illustrating the fact that the TATF may not cope with a curved track.
Figure 21B:
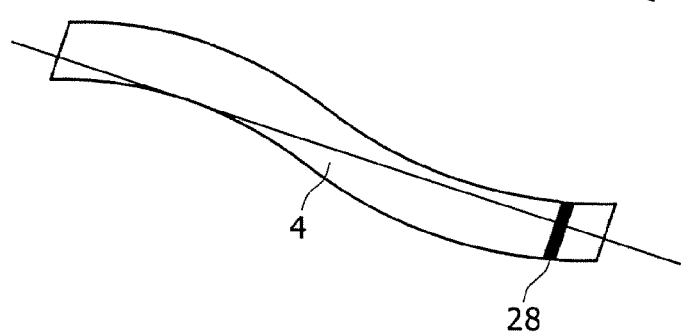

FIG. 1 shows a configuration of part of a helical scan type magnetic tape reproduction apparatus to which the present invention is applied. Though not shown, such a tracking servo (magnetic tape feeding phase control) system as described hereinabove with reference to FIG. 16 is provided also in the helical can type magnetic tape reproduction apparatus of the present embodiment.

Figure 6A:
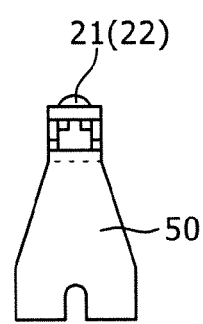
FIGS. 6A to 6C are schematic views individually showing a configuration of a reproduction head mounted for movement in the track widthwise direction.

Referring to FIG. 1, the helical scan type magnetic tape reproduction apparatus shown includes a pair of reproduction heads 21 and 22 mounted on a rotary drum 2 and configured so as to travel in the track widthwise direction. The reproduction heads 21 and 22 are shown plan in FIG. 6A and in side elevation in FIG. 6B, and are shown in a mounted state on the rotary drum 2 in FIG. 6C.

Figure 6B:
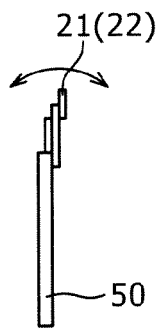
Figure 6C:
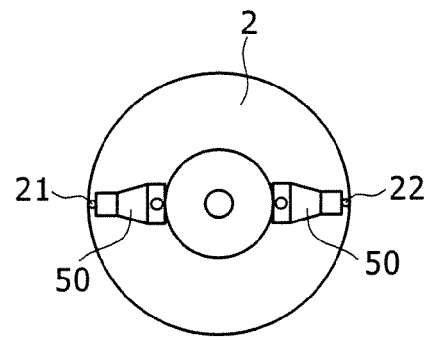

While the reproduction heads 21 and 22 themselves are mounted at an end of respective actuators 50 each in the form of a piezoelectric element, if a control voltage is applied to electrodes provided on the opposite faces of the actuators 50, then the actuators 50 are displaced in accordance with the polarity and magnitude of the control voltage. The reproduction heads 21 and 22 are moved in one of directions indicated by a double-sided arrow mark as seen in FIG. 6B by the displacement of the actuators 50. In particular, if the reproduction heads 21 and 22 are mounted on the rotary drum 2 through the other end of the actuators 50 as seen in FIG. 6C, then movement in the track widthwise direction can be implemented.

Referring back to FIG. 1, as well as the reproduction heads 21 and 22, a PG magnet 24 for detecting the rotational phase of the rotary drum 2 is mounted on the rotary drum 2, and a PG pulse is generated from a PG sensor 23 every time the PG magnet 24 reaches a specific rotational phase.

While, in the present embodiment, two such reproduction heads 21 and 22 are mounted on the rotary drum 2, two reproduction heads may not necessarily be mounted, and it is sufficient to use only one of the reproduction heads 21 and 22. Therefore, in order to simplify description of the present invention, only the reproduction head 21 is described. Also the reproduction head 22 may be configured similarly to the reproduction head 21.

A reproduction signal from the reproduction head 21 is supplied to a reproduction circuit 40 hereinafter described through a rotary transformer 25. An output signal of the reproduction circuit 40 is supplied to a marker measurement circuit 41 for measuring the time length from reference time T0 provided by a PG pulse hereinafter described to each marker. The time length from the reference time T0 to each marker obtained by the marker measurement circuit 41 is supplied to a central control apparatus (CPU: central processing unit) 42 formed from a microcomputer.

A digital control voltage according to time information of the difference between target time hereinafter described and an actual time period from the CPU 42 is supplied to a V-F conversion circuit 44 through a digital-analog conversion circuit (DAC) 43. The V-F conversion circuit 44 converts the digital control voltage into a frequency signal. An output signal of the V-F conversion circuit 44 is supplied to an F-V conversion circuit 45, which converts the frequency signal into an analog voltage through the rotary transformer 25.

The control voltage obtained on the output side of the F-V conversion circuit 45 is supplied to the actuator 50 for the reproduction head 21. The other part, which is not hereinafter described, of the reproduction system for the reproduction signals of the helical scan type magnetic tape reproduction apparatus in the present embodiment is configured similarly to that of the helical scan type magnetic tape reproduction apparatus in the past.

Figure 7A:
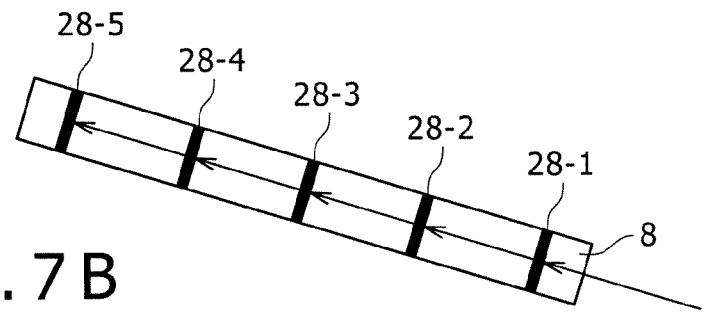
FIGS. 7A and 7B are diagrammatic views illustrating examples of a configuration of a track of a magnetic tape used in the helical scan type magnetic tape reproduction apparatus.
Figure 7B:
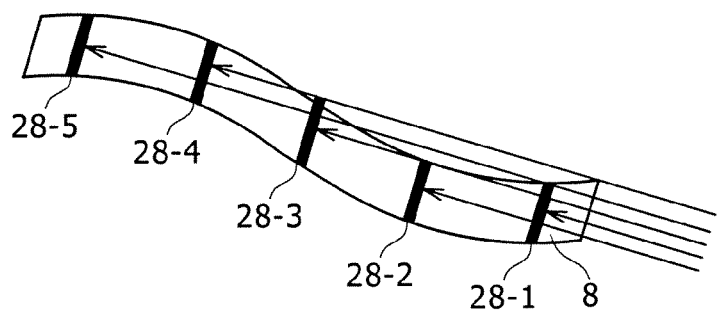

Now, a track 8 on a magnetic tape 4 to be reproduced by the helical scan type magnetic tape reproduction apparatus of the present embodiment is described with reference to FIGS. 7A and 7B. Upon data recording, markers 28-1 to 28-5 are recorded in a dispersed relationship with a substantially equal space left therebetween on a track 8 as shown in FIGS. 7A and 7B. However, upon data reproduction, the track 8 is less likely to have such a shape as shown in FIG. 7A as the width of the track 8 decreases, and generally, the track 8 exhibits such a curved S shape as shown in FIG. 7B. Therefore, it is necessary for data reproduction to be performed from the track 8 having such a shape as just described by means of a reproduction head.

To this end, it is necessary to detect the curved shape of the track 8 by measurement in advance. The curved shape can be detected by measuring the time length from a point of time of generation of the PG pulse to the on-track position at each of the markers 28-1 to 28-5. The number of such markers is set in accordance with the possible maximum curved shape of the track 8 and is set, in the present embodiment, to five for the convenience of description.

Prior to reproduction of data, it is necessary to detect the time position of each of the markers 28-1 to 28-5 recorded in a dispersed relationship on the track 8 with respect to a point of time of start of scanning (for example, a point of time of generation of a PG pulse). In order to detect the positions of the markers 28-1 to 28-5 on the track 8, the marker measurement circuit 41 for measuring time periods t1 to t5 from a point of time of start of scanning to detection of the markers 28-1 to 28-5 is demanded. Thus, the marker measurement circuit 41 and a peripheral circuit (reproduction circuit 40) are shown in FIG. 2, and a configuration of part of the marker measurement circuit 41 and associated elements is shown in FIG. 3.

Figure 2:
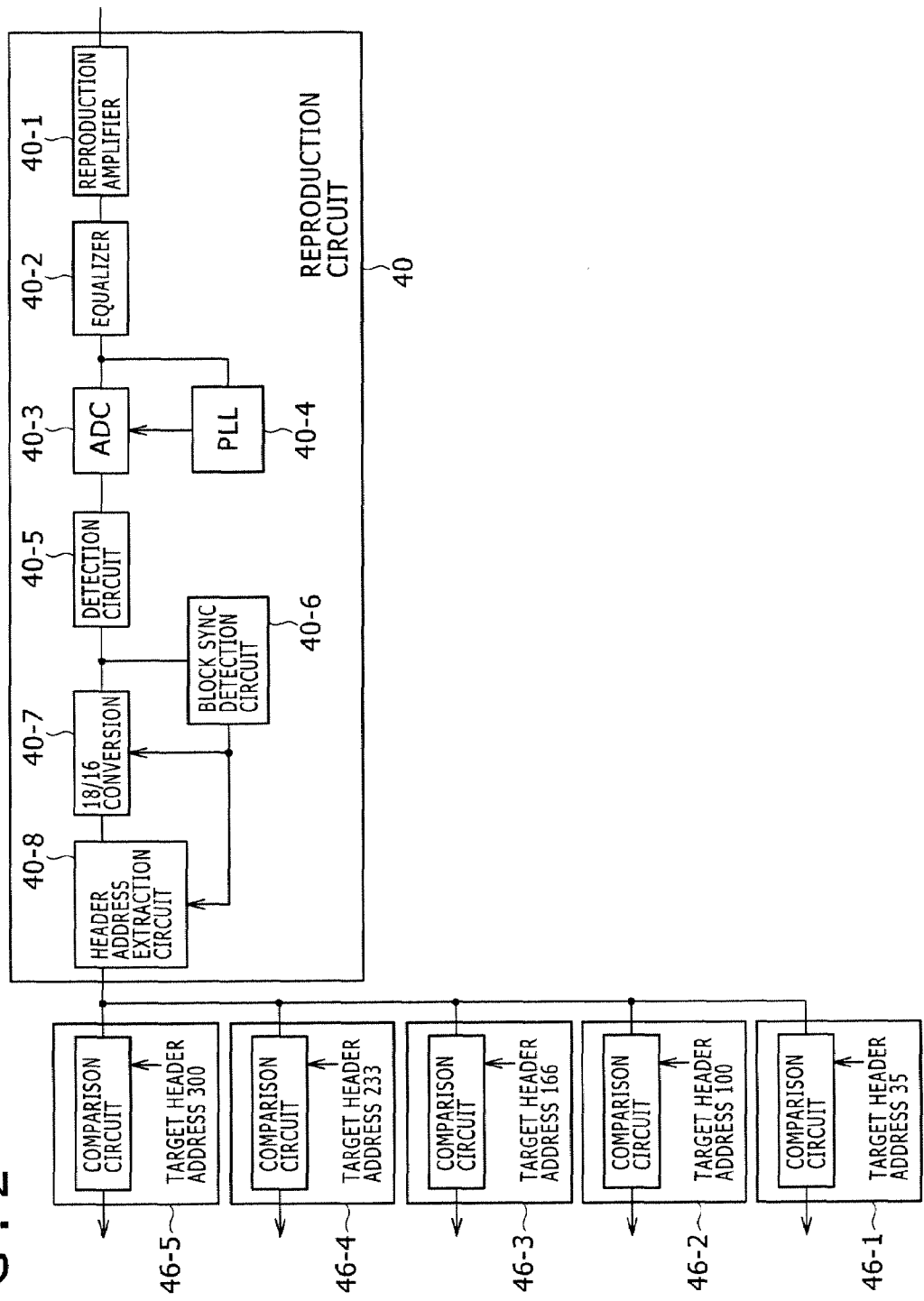
FIG. 2 is a block diagram showing a configuration of a marker measurement circuit for measuring a time length to complete of detection of markers recorded in dispersed relationship on tracks and several components of the helical scan type magnetic reproduction apparatus associated with the marker measurement circuit.
Figure 3:
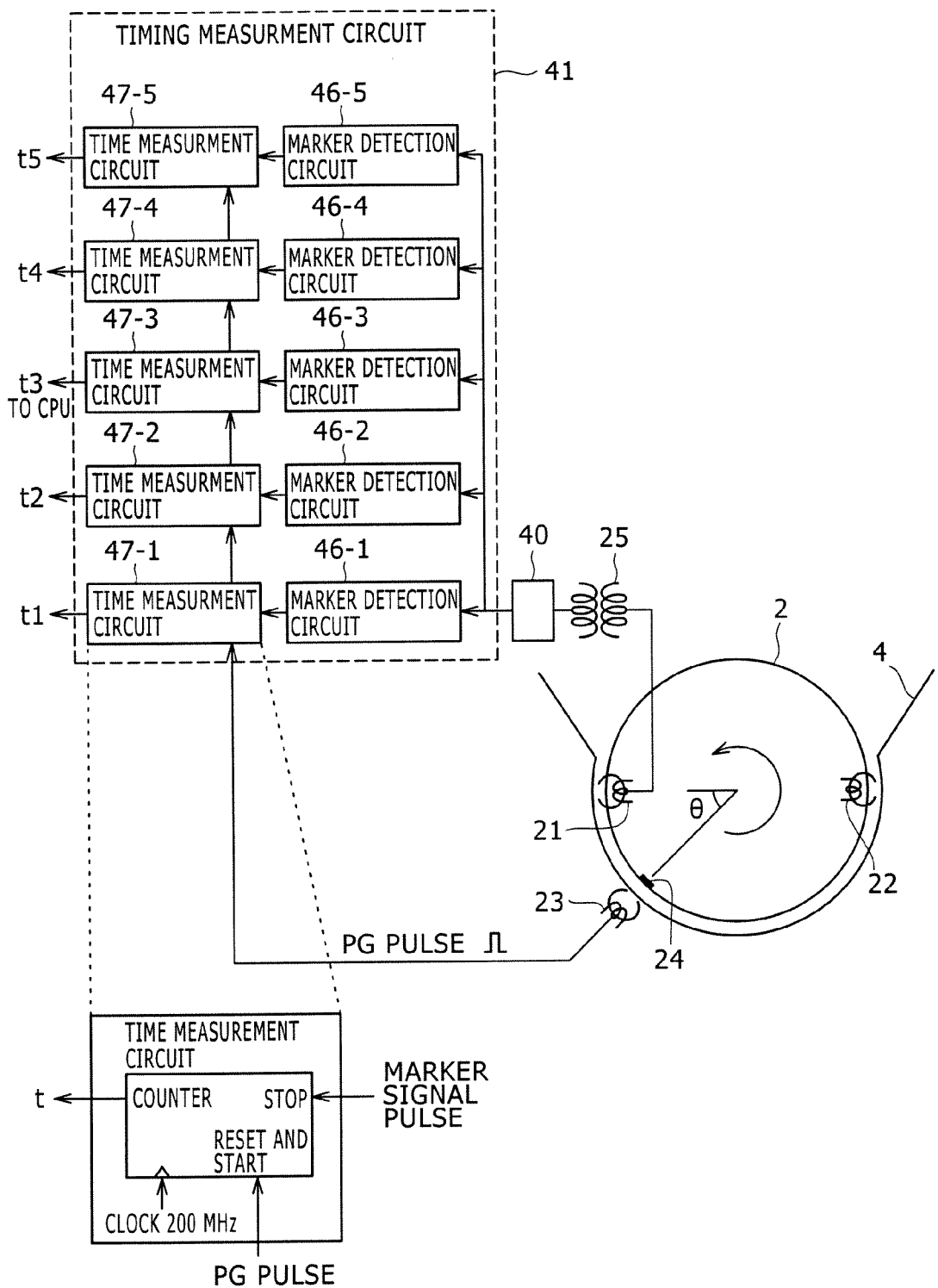
FIG. 3 is a block diagram showing a configuration of part of the marker measurement circuit and associated elements.
Figures 4, 5:
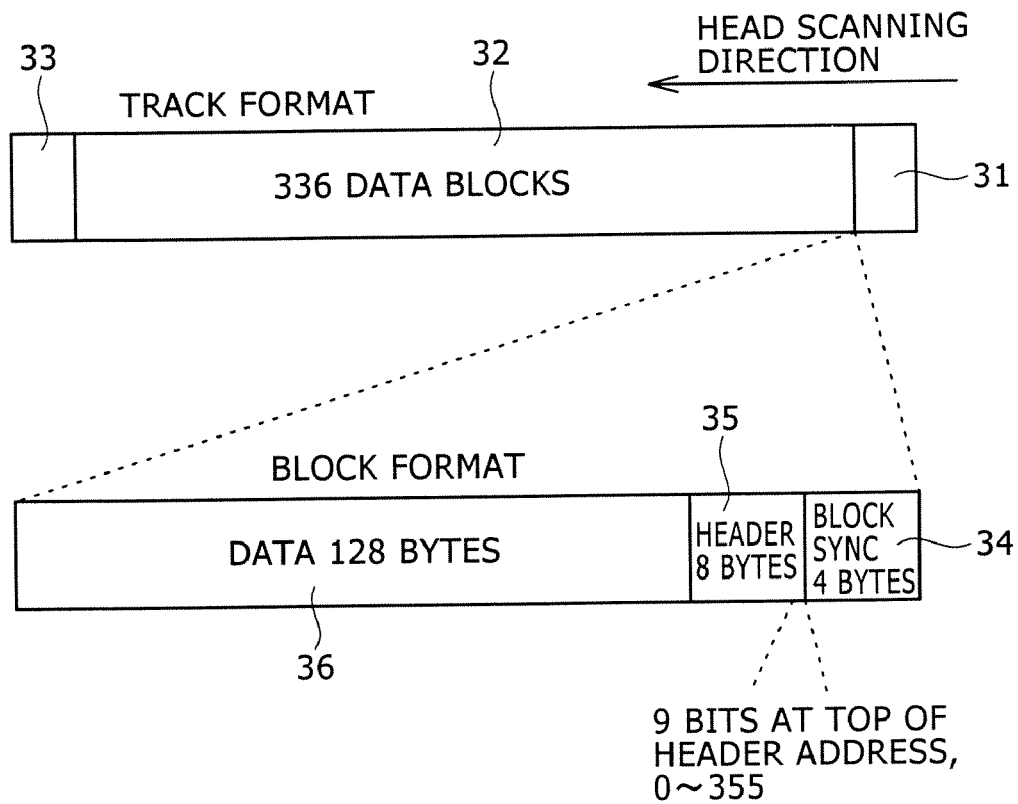
FIG. 4 is a view illustrating a format in an example of a track on a magnetic tape.
FIG. 5 is a view illustrating a corresponding relationship table between markers and header addresses.

Prior to the description to be given with reference to FIGS. 2 and 3, the markers 28-1 to 28-5 are described more particularly. For the markers 28-1 to 28-5, header addresses for individually identifying a large number of data blocks which form a track format may be utilized. Where such header addresses are utilized, there is no necessity to record redundant signals for DT servo. An example of the data format (AIT3 format) is shown in FIG. 4. Referring to FIG. 4, according to the data format shown, a data region 32 is disposed between a preamble 31 and a postamble 33, and 336 data blocks are recorded successively in the data region 32. Each data block includes, as indicated as a block format, a block sync (block synchronizing signal) 34 for 4 bytes, a header 35 for 8 bytes and data 36 for 128 bytes.

The header address mentioned hereinabove is an address (0 to 511) represented by 9 bits at the top of the header 35. In this instance, however, since the number of data blocks on one track is 336, 0 to 335 are used as the header addresses. Five suitable ones of the header addresses 0 to 335 are selected for the markers 28-1 to 28-5. However, in order to allow a curved condition to be measured uniformly over the full track length, the header addresses should be selected in an individually associated relationship with the markers in such a manner as defined in an associated relationship table which defines an associated relationship between the markers 28-1 to 28-5 and the header addresses. An example of the associated relationship table is illustrated in FIG. 5.

Referring to FIGS. 2 and 3, each of the header addresses successively extracted by a reproduction circuit 40 whose internal configuration is hereinafter described is compared with preset header addresses (header addresses illustrated in FIG. 4) by marker detection circuits 46-1 to 46-5 provided in an associated relationship with the markers 28-1 to 28-5, respectively, and serving as comparison circuits. If the comparison reveals coincidence with one of the preset header addresses, then a marker signal pulse is obtained from a corresponding one of the marker detection circuits 46-1 to 46-5. In response to the marker signal pulse, a corresponding one of time measurement circuits 47-1 to 47-5, which serve as counters, stops its counting operation. As regards the frequency of a clock signal to the counters, since the time conversion value of a 1 μm off-track amount is test calculated as 758 ns as described hereinabove, if 758 ns is counted with 200 MHz, then this corresponds to 152 counts. Therefore, a sufficiently high resolution is obtained.

The configuration of the reproduction circuit 40 is described briefly. Referring to FIG. 2, the reproduction circuit 40 includes a reproduction amplifier 40-1 for amplifying a reproduction signal from the reproduction head 21, an equalizer (equalization circuit) 402, an A/D (analog to digital) conversion circuit (ADC) 40-3, and a PLL (Phase Locked Loop) circuit 40-4. The reproduction circuit 40 further includes a detection circuit 40-5, a block sync detection circuit 40-6, a 18/16 conversion circuit 40-7, and a header address extraction circuit 40-8. One of header addresses 0 to 511 is detected from within a reproduction signal from the reproduction head 21 by the header address extraction circuit 40-8 and is compared with the preset header addresses by the marker detection circuits 46-1 to 46-5.

Referring now to FIG. 3, a PG pulse described hereinabove is generated at the same time with start of scanning of a track by the reproduction head 21 in a non-tracking servo traveling state of the magnetic tape 4. In response to the PG pulse, the counters in the time measurement circuits 47-1 to 47-5 in the marker measurement circuit 41 provided in an associated relationship with the markers 28-1 to 28-5, respectively, are reset and placed into a state wherein they count the clock signal whose frequency may be, for example, 200 MHz. Meanwhile, after the start of scanning, a reproduction signal is obtained from the reproduction head 21. The reproduction signal is supplied through the rotary transformer 25 to and processed by the reproduction circuit 40. Consequently, the header addresses included in the reproduction signal are successively extracted by the reproduction circuit 40.

Figure 8:
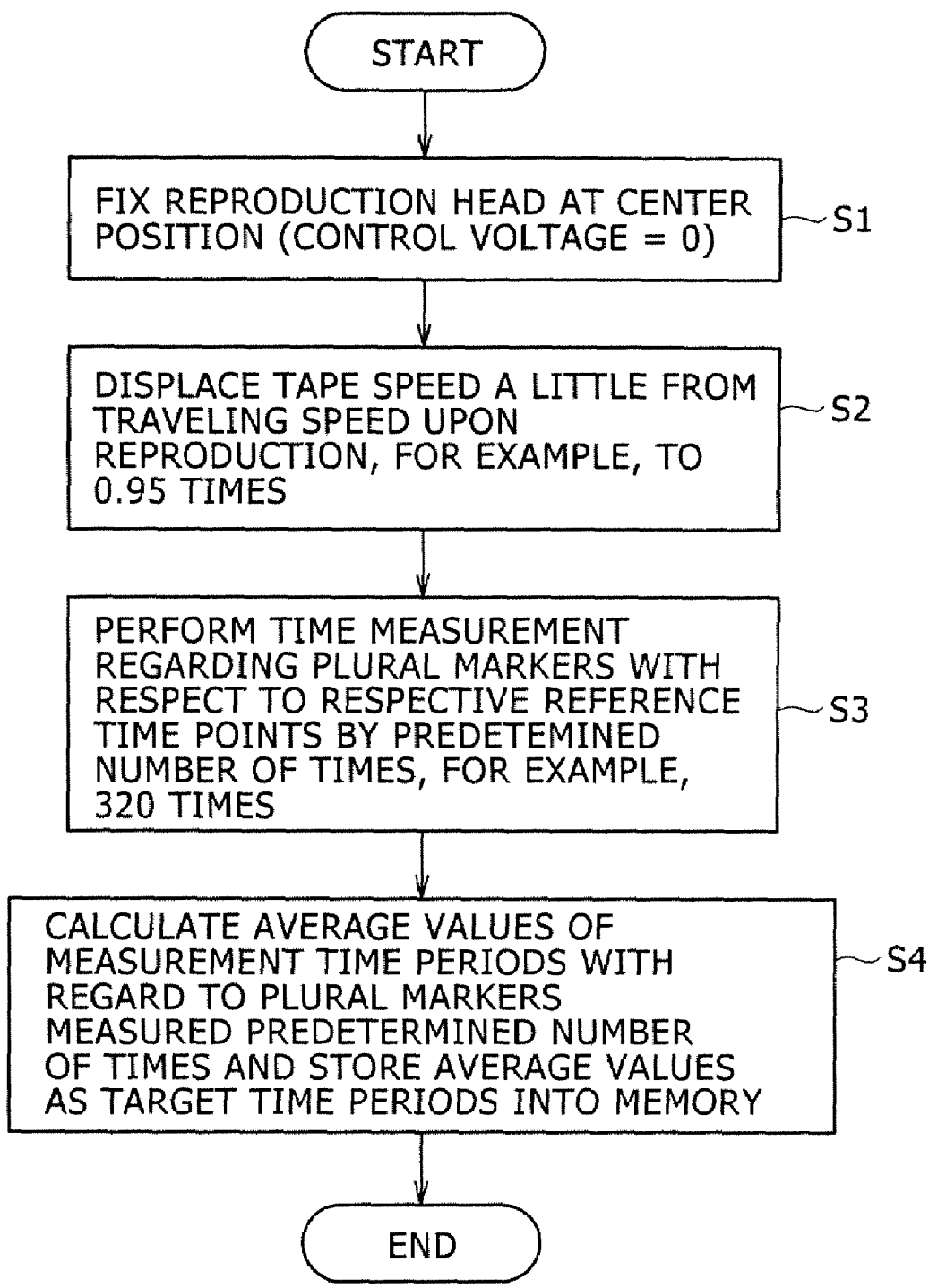
FIG. 8 is a flow chart illustrating operation of the helical scan type magnetic tape reproduction apparatus.

In the present embodiment, prior to reproduction of data by the helical scan type magnetic tape reproduction apparatus, target time periods T1 to T5 for the markers 28-1 to 28-5 on the magnetic tape 4 with respect to the reference time T0 are determined in accordance with a flow chart of FIG. 8.

Referring to FIG. 8, first at step S1, the control voltage to be supplied to the actuator 50 for the reproduction head 21 is set to 0 to fix the reproduction head 21 at the center position of the track 8.

Then at step S2, the tape speed of the magnetic tape 4 is set to a speed displaced a little from the traveling speed upon reproduction, for example, to a speed equal to 0.95 times the traveling speed upon reproduction and a non-tracking servo state is established.

In this state, scanning of the reproduction head 21 is performed at step S3 to measure the intervals of time at the markers 28-1 to 28-5 with respect to the reference time T0 which may be produced, for example, from the PG pulse signal. Such scanning is performed successively by a predetermined number of times, for example, 320 times.

Figure 9:
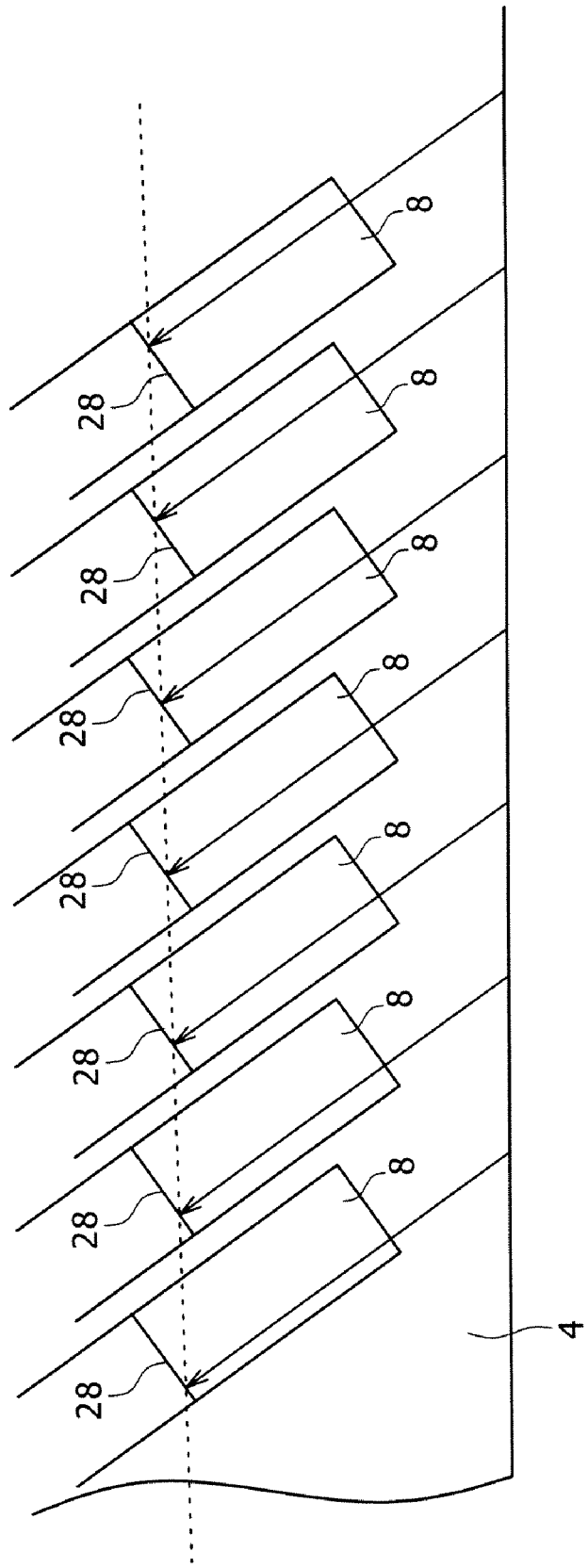
FIG. 9 is a schematic view illustrating operation of the helical scan type magnetic tape reproduction apparatus.

Then at step S4, the measurement time periods regarding the markers 28-1 to 28-5 with respect to the reference time T0 measured by the predetermined number of times, for example, 320 times are averaged individually by the CPU 42, and the average values are stored as target time periods T1 to T5 for the markers 28-1 to 28-5 into the memory provided in the CPU 42.

Where the tape speed of the magnetic tape 4 is set to a speed displaced a little from the traveling speed upon reproduction such as, for example, to a speed equal to 0.95 times the traveling speed upon reproduction and a non-tracking servo state is established and then the track 8 of the magnetic tape 4 is scanned successively by a predetermined number of times by means of the reproduction head 21, the track 8 is displaced little by little with respect to the locus of the reproduction head 21 as indicated by arrow marks in FIG. 9. It is known that, if a marker 28 at the same position of the track 8 can be read by a predetermined number of times, then a period of time obtained by averaging the periods of time in which the track 8 can be read by the predetermined number of times indicates the track center of the marker 28. This is true also where the track is curved.

Accordingly, the target time periods T1 to T5 of the markers 28-1 to 28-5 of the track 8 of the magnetic tape 4 indicate the track center of the markers 28-1 to 28-5.

Such determination of the target time periods T1 to T5 of the markers 28-1 to 28-5 of the track 8 of the magnetic tape 4 is performed when reproduction of data of the magnetic tape 4 is to be started, when data reproduced include many errors and so forth.

Figure 10:
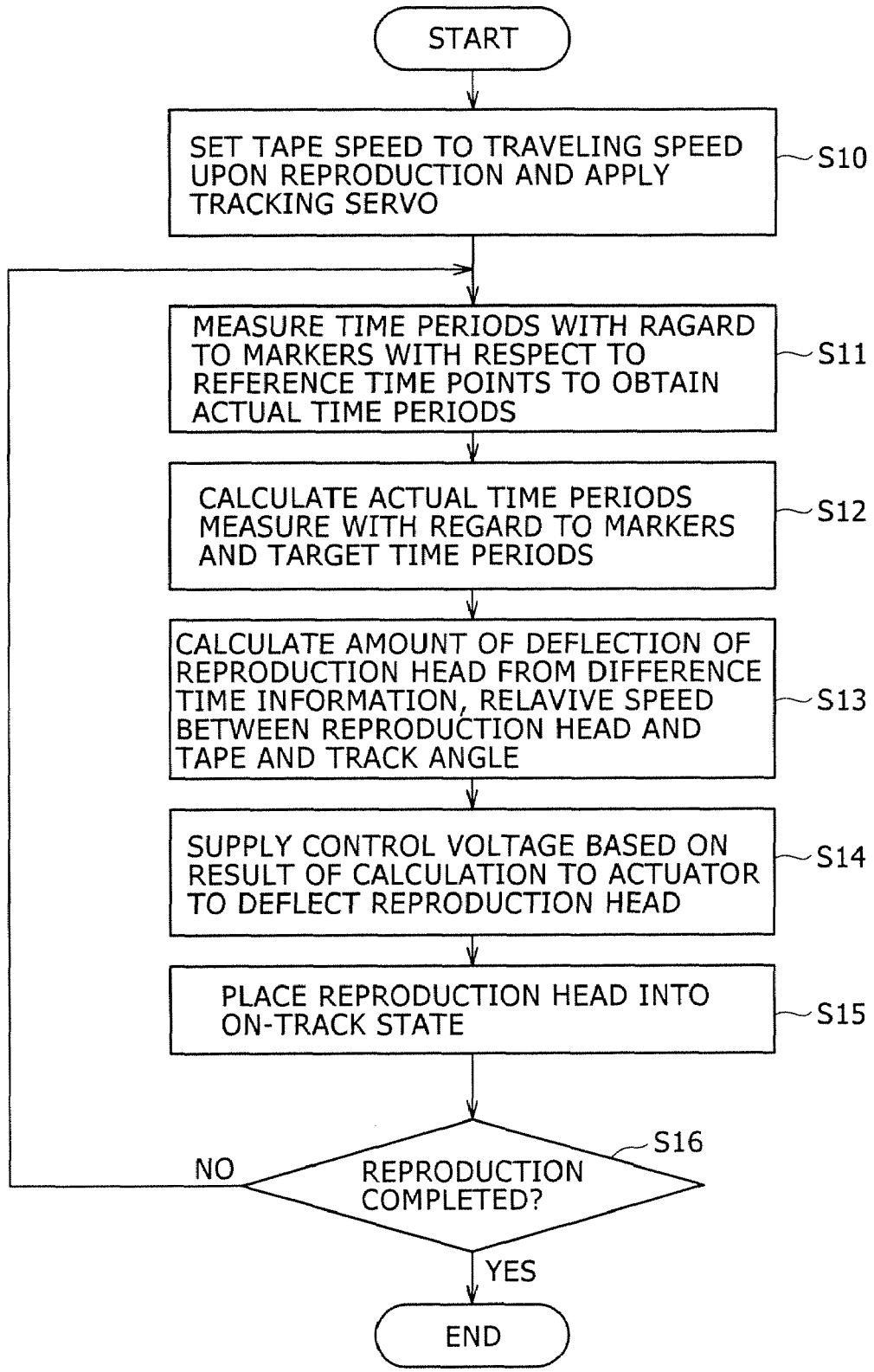
FIG. 10 is a flow chart illustrating operation of the helical scan type magnetic tape reproduction apparatus.
Figure 11:
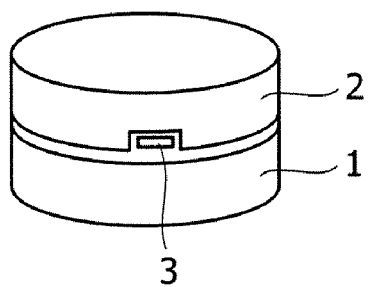
FIG. 11 is a schematic view showing a general configuration of a recording head and associated elements in a typical helical scan type magnetic recording and reproduction apparatus.
Figure 12:
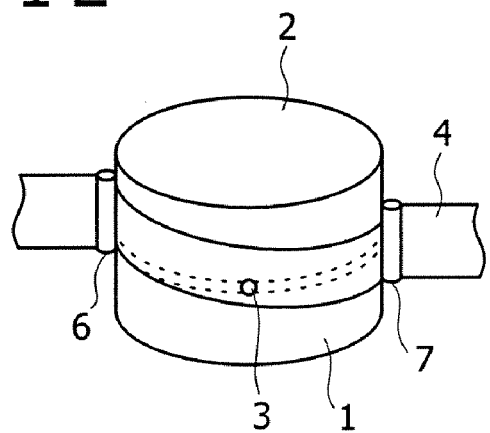
FIG. 12 is a schematic view showing a magnetic tape wrapped on a fixed drum and a rotary drum in the typical helical scan type magnetic recording and reproduction apparatus.
Figure 13:
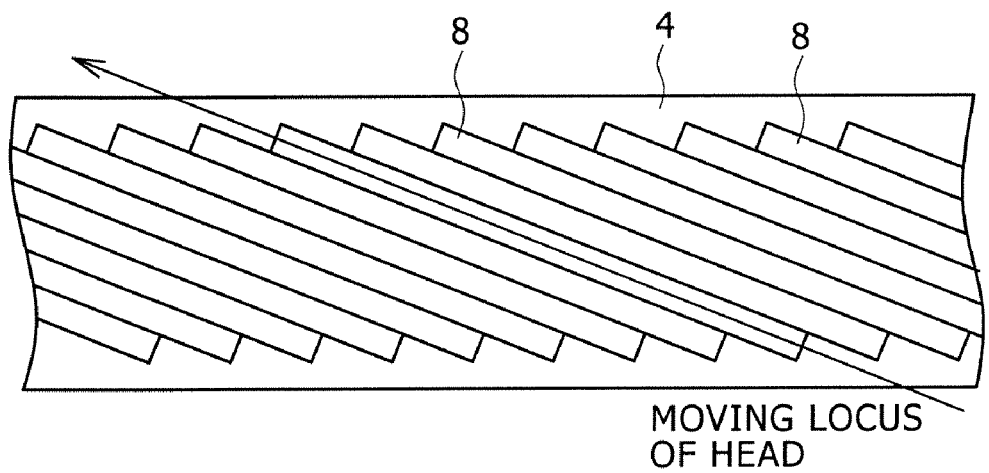
FIG. 13 is a view showing a traveling locus of a reproduction head of the typical helical scan type magnetic recording and reproduction apparatus which is in an on-track state with respect to tracks on a magnetic tape.
Figure 14:
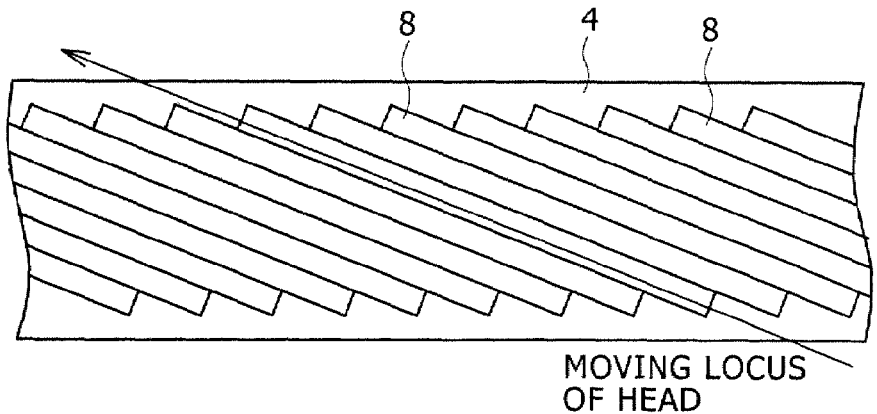
FIG. 14 is a similar view but showing a traveling locus of a reproduction head of the typical helical scan type magnetic recording and reproduction apparatus which is in an off-track state with respect to tracks on a magnetic tape.
Figure 15A:
FIGS. 15A and 15B are schematic views individually showing reproduction signal envelopes in an on-track state and an off-track state, respectively.
Figure 15B:
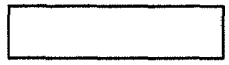

Now, reproduction of data recorded and stored on the magnetic tape 4 by the helical scan type magnetic tape reproduction apparatus of the present embodiment is described with reference to a flow chart of FIG. 10.

First at step S10, the tape speed of the magnetic tape 4 is set to the traveling speed upon reproduction and tracking servo is applied. In this tracking servo state, the periods of time regarding the markers 28-1 to 28-5 of the tracks 8 of the magnetic tape 4 with respect to the reference time T0 formed from the PG pulse are measured to obtain the actual time periods t1 to t5 at step S11.

Then at step S12, the differences between the actual time periods t1 to t5 measured at the markers 28-1 to 28-5 and the target time periods T1 to T5 determined in advance and stored in the memory of the CPU 42, that is, T1-t1, T2-t2, T3-t3, T4-t4 and T5-t5, are calculated by the CPU 42.

From the difference time information, the relative speed between the reproduction head 21 and the magnetic tape 4 and the track angle, the amount by which the reproduction head 21 is to be deflected is calculated in accordance with the following expression by the CPU 42 at step S13:

Deflection amount of reproduction head=time difference×relative speed×tan(track angle)

At step S14, a control voltage corresponding to the value obtained by the calculation at step S13 is supplied to the actuator 50 for the reproduction head 21 to deflect the reproduction head 21. As a result of the deflection of the reproduction head 21, an on-track state is obtained at each of the markers 28-1 to 28-5 of each of the track 8 at step S15. Thereafter, it is decided at step S16 whether or not the reproduction of data is completed. The processes at steps S11 to S15 are repeated until after it is decided at step S16 that the reproduction of data is completed.

In summary, in the present embodiment, the tape speed of the magnetic tape 4 is set to a speed displaced a little from the traveling speed upon reproduction such as, for example, to a speed 0.95 times the traveling speed upon reproduction and a non-tracking servo state is established. Then, each of the tracks 8 on the magnetic tape 4 on each of which a plurality of, for example, five, markers 28-1 to 28-5 are recorded in a dispersed relationship at predetermined positions is scanned successively by a predetermined number of times by means of the reproduction head 21 to successively measure the time periods from the reference time T0 to the markers 28-1 to 28-5 by a predetermined number of times, for example, by 320 times. Then, the measurement time periods regarding the markers 28-1 to 28-5 with respect to the reference time T0 measured by the predetermined number of times, for example, 320 times are averaged individually, and the average values are stored as target time periods T1 to T5 for the markers 28-1 to 28-5 into the memory.

In the present embodiment, upon reproduction of data recorded and stored on the magnetic tape 4, in the tracking state, the amount by which the reproduction head 21 is to be deflected is determined from the differences between the actual time periods t1 to t5 measured at the markers 28-1 to 28-5 of the tracks 8 of the magnetic tape 4 and the target time periods T1 to T5 representing the track centers of the markers 28-1 to 28-5, that is, T1-t1, T2-t2, T3-t3, T4-t4 and T5-t5, the relative speed between the reproduction head 21 and the magnetic tape 4 and the track angle. Then, the reproduction head 21 is deflected by the thus determined amount. Therefore, an on-track state is established at the positions of the markers 28-1 to 28-5 of the tracks 8. Therefore, even where the track 8 suffers from a uniform curve, data can be read out well from the tracks 8.

While a preferred embodiment of the present invention has been described using specific terms, such description is for illustrative purposes only, and it is to be understood that changes and variations may be made without departing from the spirit or scope of the following claims.

What is claimed is:

1. A helical scan type magnetic tape reproduction apparatus, comprising:

a helical scan type reproduction head mounted at an end of an actuator and capable of moving, in order to successively scan tracks on a magnetic tape, in the track widthwise direction by displacement of said actuator itself;

target time decision means for measuring, in a non-tracking servo traveling state of the magnetic tape and in a traveling speed state of the magnetic tape displaced a little from a reproduction traveling speed, a period of time from a reference point of time with regard to each of a plurality of markers recorded in a dispersed relationship at predetermined positions on the tracks in advance to the marker by a predetermined number of times, averaging the measurement time periods of the markers obtained by the predetermined number of times of measurement and storing the average time periods with regard to the markers as target time periods; and tracking control means for measuring actual time periods from the reference time points with regard to the markers in a tracking servo traveling state of the magnetic tape and performing updating control of a control voltage to be applied to said actuator for said reproduction head in accordance with time information of the differences between the target time periods and the actual time periods.

2. The helical scan type magnetic tape reproduction apparatus according to claim 1, wherein the reference times are obtained from a PG pulse of a rotary drum.

3. The helical scan type magnetic tape reproduction apparatus according to claim 1, wherein the predetermined number of times is approximately 320 times.

4. The helical scan type magnetic tape reproduction apparatus according to claim 1, wherein the plural markers are recorded in a substantially equally spaced relationship from each other on the tracks.

5. The helical scan type magnetic tape reproduction apparatus according to claim 1, wherein the plural markers are selected from among header addresses for identifying a plurality of data blocks which form a track format.

6. The helical scan type magnetic tape reproduction apparatus according to claim 1, wherein the traveling speed displaced a little from the reproduction traveling speed is equal to approximately 0.95 times the reproduction traveling speed.

7. A helical scan type magnetic tape reproduction method, comprising the steps of:

measuring, in a non-tracking servo traveling state of a magnetic tape and in a traveling speed state of the magnetic tape displaced a little from a reproduction traveling speed, a period of time from a reference point of time with regard to each of a plurality of markers recorded in a dispersed relationship at predetermined positions on tracks of the magnetic tape in advance to the marker by a predetermined number of times, averaging the measurement time periods with regard to the markers by the predetermined number of times of measurement and storing the average time periods with regard to the markers as target time periods; and measuring actual time periods from the reference time points with regard to the markers in a tracking servo traveling state of the magnetic tape and performing updating control of a control voltage to be applied to an actuator for a helical scan type reproduction head, which is mounted at an end of said actuator and capable of moving, in order to successively scan the tracks on the magnetic tape, in the track widthwise direction by displacement of said actuator itself, in accordance with time information of the differences between the target time periods and the actual time periods.

* * * * *